United States Patent
Fumino et al.

(10) Patent No.: US 8,964,097 B2
(45) Date of Patent: Feb. 24, 2015

(54) IMAGE CAPTURING APPARATUS CAPABLE OF IMPROVING THE DURABILITY OF A VIEWFINDER EQUIPPED WITH A VARIABLE MAGNIFICATION LENS

(71) Applicant: FUJIFILM Corporation, Tokyo (JP)

(72) Inventors: Shogo Fumino, Saitama (JP); Tadashi Jogetsu, Saitama (JP); Kouhei Awazu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/227,276

(22) Filed: Mar. 27, 2014

(65) Prior Publication Data

US 2014/0211063 A1    Jul. 31, 2014

Related U.S. Application Data

(63) Continuation of application No. PCT/JP2012/072943, filed on Sep. 7, 2012.

(30) Foreign Application Priority Data

Sep. 28, 2011  (JP) .................................. 2011-213130

(51) Int. Cl.
*H04N 5/222* (2006.01)
*H04N 5/232* (2006.01)
(Continued)

(52) U.S. Cl.
CPC ............ *H04N 5/23296* (2013.01); *G03B 13/10* (2013.01); *G03B 13/06* (2013.01); *H04N 5/23212* (2013.01); *H04N 5/23293* (2013.01)
USPC ................... 348/341; 348/222.1; 348/333.09; 348/374; 396/148; 396/379

(58) Field of Classification Search
USPC ................................ 348/333.03, 333.09, 341
See application file for complete search history.

(56) References Cited

U.S. PATENT DOCUMENTS 5,519,465 A      5/1996   Kawamura et al.
6,670,989 B2 *  12/2003   Kawanishi et al. ...... 348/240.99
(Continued)

FOREIGN PATENT DOCUMENTS

JP      1-217432 A    8/1989
JP      1-140523 U    9/1989
(Continued)

OTHER PUBLICATIONS

International Search Report Issued in PCT/JP2012/072943, mailed on Oct. 16, 2012.

*Primary Examiner* — Ngoc-Yen Vu
(74) *Attorney, Agent, or Firm* — Birch, Stewart, Kolasch & Birch, LLP

(57) ABSTRACT

An image capturing apparatus includes: a photographing optical system; an image capturing element; and a viewfinder device, in which the viewfinder device includes at least one variable magnification lens that may be inserted on and removed from an optical path of the viewfinder device, and a drive mechanism configured to drive the variable magnification lens, in which the image capturing apparatus further includes: a variable magnification lens control unit configured to supply a drive signal to the drive mechanism so as to control the insertion and removal of the variable magnification lens on and from the optical path, and perform a high-speed control to move the variable magnification lens through a maximum moving distance for a first time, and a low-speed control to move the variable magnification lens through the maximum moving distance for a second time that is longer than the first time.

5 Claims, 10 Drawing Sheets

(51) Int. Cl.
*G03B 13/10* (2006.01)
*G03B 13/06* (2006.01)
*G03B 13/02* (2006.01)

(56) References Cited

U.S. PATENT DOCUMENTS

| | | | |
|---|---|---|---|
| 7,397,609 B2* | 7/2008 | Akiyama et al. | 359/676 |
| 8,111,323 B2* | 2/2012 | Ueda et al. | 348/372 |
| 2008/0024653 A1 | 1/2008 | Ikeda | |
| 2010/0238321 A1* | 9/2010 | Honjo et al. | 348/231.99 |
| 2013/0194479 A1* | 8/2013 | Jogetsu | 348/333.08 |
| 2014/0226054 A1* | 8/2014 | Tamura | 348/333.08 |

FOREIGN PATENT DOCUMENTS

| | | |
|---|---|---|
| JP | 4-177208 A | 6/1992 |
| JP | 10-96998 A | 4/1998 |
| JP | 11-38477 A | 2/1999 |
| JP | 2007-57678 A | 3/2007 |
| JP | 2008-35268 A | 2/2008 |

* cited by examiner

IMAGE CAPTURING APPARATUS CAPABLE OF IMPROVING THE DURABILITY OF A VIEWFINDER EQUIPPED WITH A VARIABLE MAGNIFICATION LENS

CROSS REFERENCE TO RELATED APPLICATION

This is a continuation of International Application No. PCT/JP2012/072943 filed on Sep. 7, 2012, and claims priority from Japanese Patent Application No. 2011-213130, filed on Sep. 28, 2011, the entire disclosures of which are incorporated herein by reference.

BACKGROUND

1. Technical Field

The invention relates to an image capturing apparatus equipped with a viewfinder device.

2. Related Art

There has been proposed a viewfinder structure for an image capturing apparatus that is capable of changing a viewfinder magnification by a simple mechanism according to a focal distance of a photographing optical system (see, e.g., Patent Literature 1 (JP-A-11-38477) and Patent Literature 2 (JP-A-1-217432)).

The image capturing apparatuses disclosed in Patent Literatures 1 and 2 are configured such that any one variable magnification lens of a wide-angle side lens and a telescopic side lens is inserted on an optical path of the viewfinder device. As a result, the viewfinder magnification may be simply changed according to the focal distance of the photographing optical system.

Further, although not related to a viewfinder device, Patent Literature 3 (JP-A-2008-35268) describes an image capturing apparatus, which is equipped with an ND filter having a transparent portion and a density gradation portion which optionally open or close an opening of an aperture mechanism in such a manner that the aperture closing speed of the ND filter in relation to the opening when the gradation portion closes the opening of the aperture mechanism is set to be different from the aperture closing speed of the ND filter when the transparent portion closes the opening of the aperture mechanism.

SUMMARY OF INVENTION

The viewfinder device disclosed in Patent Literatures 1 and 2 is configured such that the variable magnification lens is mechanically inserted and removed on or from the optical path. Therefore, if the viewfinder device is continuously used, the variable magnification lens or peripheral members thereof are worn, thereby causing a reduction of the life of the image capturing apparatus equipped with the viewfinder device. Patent Literatures 1 and 2 do not describe how the abrasion of the variable magnification lens or the peripheral members can be reduced. Since Patent Literature 3 does not relate to the viewfinder device equipped with the variable magnification lens, it is impossible to prevent the variable magnification lens or the peripheral members from being worn.

An illustrative aspect of the present invention is to provide an image capturing apparatus, which may improve the durability of a viewfinder device equipped with a variable magnification lens such that the life span of a product may be extended.

According to an aspect of the present invention, an image capturing apparatus includes: a photographing optical system; an image capturing element configured to capture an image through the photographing optical system; and a viewfinder device configured to be capable of observing a photographic subject through an optical system that is different from the photographing optical system, in which the viewfinder device includes at least one variable magnification lens that may be inserted on and removed from an optical path of the viewfinder device, the at least one variable magnification lens being configured to change a focal distance of the viewfinder device, and a drive mechanism configured to drive the variable magnification lens, in which the image capturing apparatus further comprises: a variable magnification lens control unit configured to supply a drive signal to the drive mechanism so as to control the insertion and removal of the variable magnification lens on and from the optical path, in which one end of the variable magnification lens in a moving direction is in contact with a wall provided in the viewfinder device in a state where the variable magnification lens is inserted on the optical path, in which a moving distance of the variable magnification lens from a state where the variable magnification lens is inserted on the optical path to a state where the variable magnification lens is removed from the optical path and the other end of the variable magnification lens is in contact with a wall provided in the viewfinder device is set to a maximum moving distance of the variable magnification lens, and in which the variable magnification lens control unit performs a high-speed control to move the variable magnification lens through the maximum moving distance for a first time, and a low-speed control to move the variable magnification lens through the maximum moving distance for a second time that is longer than the first time.

With the configuration described above, it is possible to provide an image capturing apparatus, which may improve the durability of a viewfinder device equipped with a variable magnification lens such that the life span of a product may be extended.

DESCRIPTION OF EMBODIMENTS

Hereinafter, the exemplary embodiment of the present invention will be described with reference to the accompanying drawings. A digital camera will be described below as an example of an image capturing apparatus.

Figure 1:
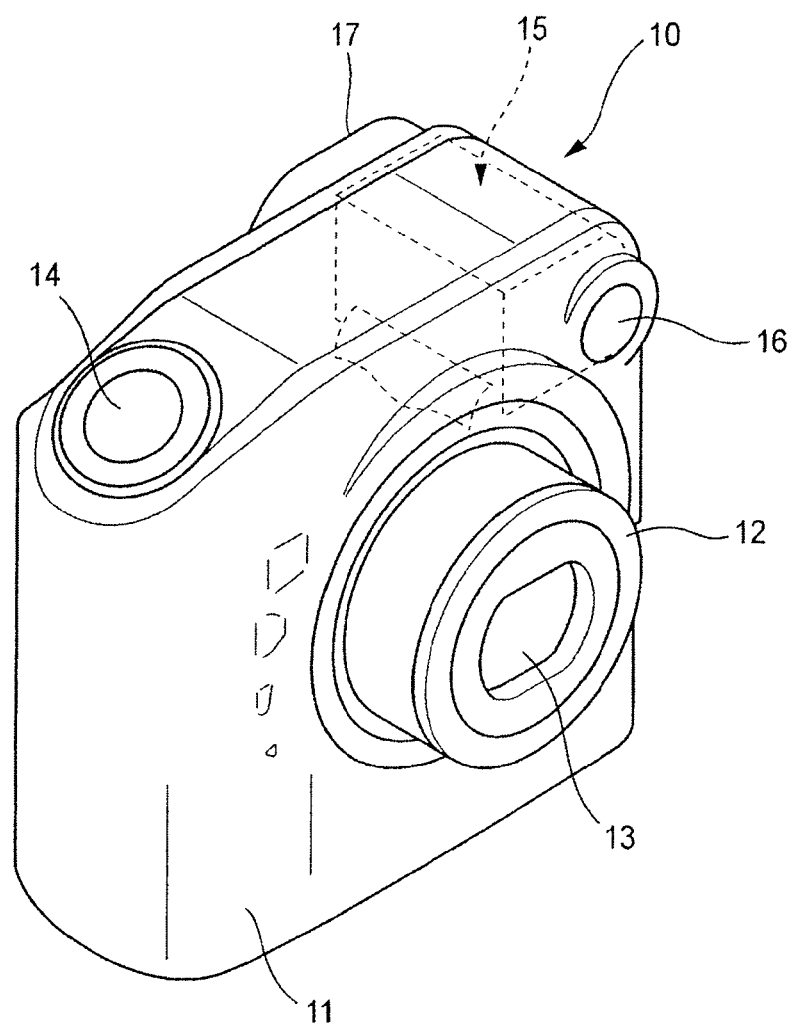
FIG. 1 is a perspective view illustrating an external appearance of a digital camera according to an exemplary embodiment of the present invention.

FIG. 1 is a perspective view showing an external appearance of a digital camera according to an exemplary embodiment of the present invention.

The digital camera 10 is provided with a rectangular casing 11. A lens barrel 12 is detachably provided at the center of a front surface of the casing 11. A photographing lens 13 (e.g., a focus lens for aligning a focal position or a zoom lens) is received in the lens barrel 12. An additional optical system such as a zoom lens or a conversion lens may be added to the lens barrel 12.

A shutter release button 14 is provided at a side of an upper end of the casing 11. A viewfinder device 15 is provided at a corner, which is opposite to the shutter release button 14 provided at the upper end of the casing 11. A photographic subject side viewfinder window 16 of the viewfinder device 15 is formed at a corner of the front of the casing 11. An eyepiece window 17 of the viewfinder device 15 is provided on a rear surface of the casing 11 to face the photographic subject side viewfinder window 16.

Figure 2:
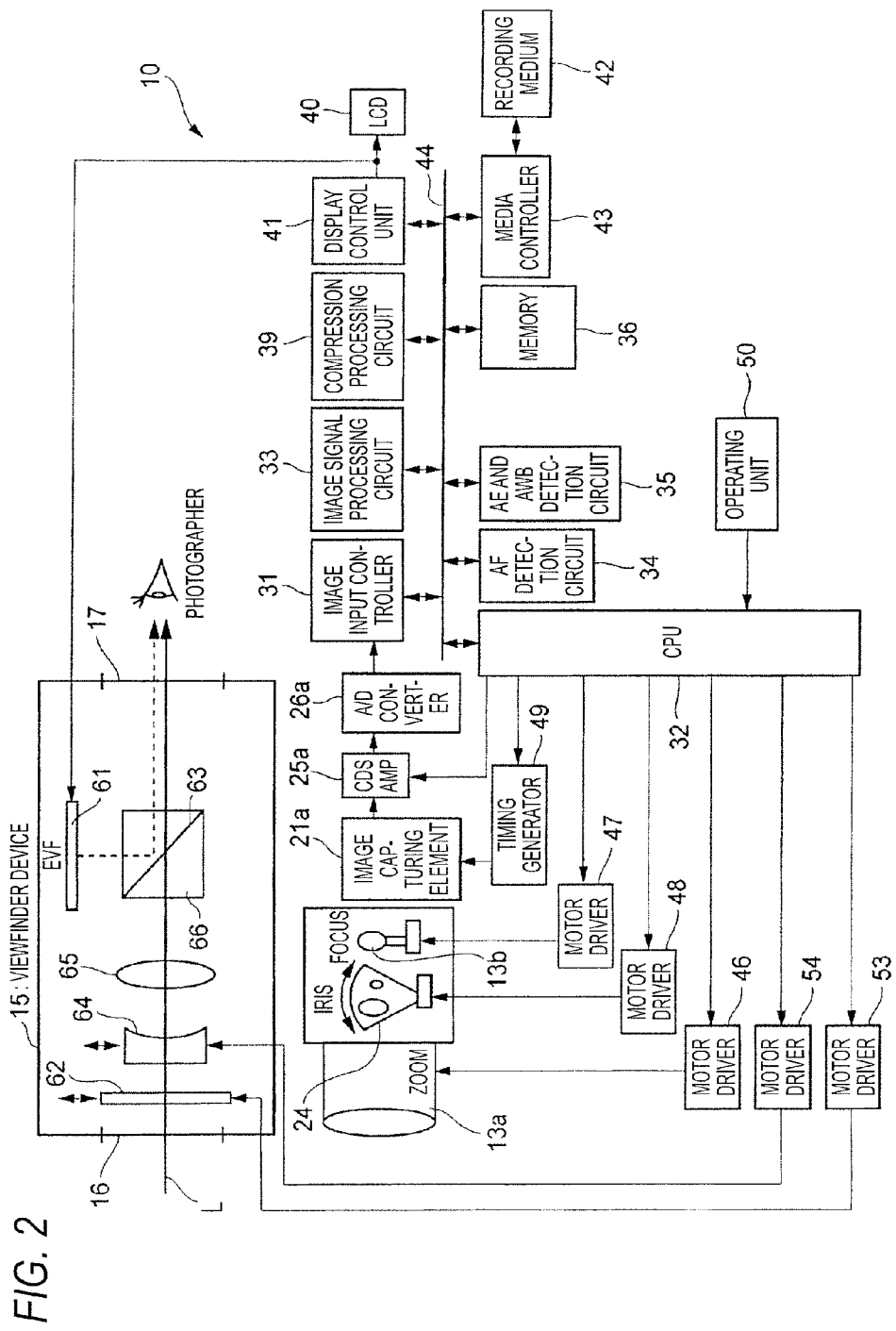
FIG. 2 is a block diagram illustrating an interior configuration of a digital camera 10 illustrated in FIG. 1.

FIG. 2 is a block diagram showing an interior configuration of the digital camera 10 illustrated in FIG. 1.

The digital camera 10 is provided with a CCD type solid state image capturing element 21*a*, a photographing optical system disposed in front of the solid state image capturing element 21*a*, a CDSAMP 25*a* configured to process an output signal (photographing image signal) of the solid state image capturing element 21*a* in the form of an analog signal, an analog digital (A/D) converter 26*a* configured to convert the output signal of the CDSAMP 25*a* into a digital signal, and the viewfinder device 15. The photographing optical system includes the photographing lens 13 (the zoom lens is denoted by reference numeral 13*a* and the focus lens is denoted by reference numeral 13*b*), and an aperture (iris) 24.

The solid state image capturing element 21*a* is a CCD type in the example of FIG. 2, but may be a different type of solid state image capturing element such as a CMOS type.

The viewfinder device 15 is provided with the photographic subject side viewfinder window 16, the eyepiece window 17, an OVF shutter 62, a variable magnification lens 64, a focal-distance-fixed object lens 65, a prism 66 having a half mirror 63 therein, and a display unit 61. Between the photographic subject side viewfinder window 16 and the eyepiece window 17, the OVF shutter 62, the variable magnification lens 64, the object lens 65, and the prism 66 are disposed in this order along an incident optical axis L of the viewfinder device 15.

The OVF shutter 62 is removably provided on an optical path following the optical axis L. The OVF shutter 62 may assume a closed state where it is inserted on the optical path of the viewfinder device 15, and an open state where it is retracted from the optical path of the viewfinder device 15.

In the closed state, the OVF shutter 62 is inserted into a position at which it covers the photographic subject side viewfinder window 16. Therefore, in the closed state, light incident on the photographic subject side viewfinder window 16 is blocked by the OVF shutter 62, thus prohibiting the light from being incident on the eyepiece window 17.

In the open state, the OVF shutter 62 is retracted to a position at which it does not cover the photographic subject side viewfinder window 16. Therefore, in the open state, light incident on the photographic subject side viewfinder window 16 is not blocked by but passes through the OVF shutter 62, so that the light may be incident on the eyepiece window 17.

The OVF shutter 62 may comprise a plate-shaped member that absorbs or reflects light and is mechanically removably inserted, or a device (e.g., liquid crystal shutter) that can electrically control transmissivity.

The variable magnification lens 64 is insertably and removably provided on the optical path of the viewfinder device 15. The variable magnification lens 64 serves to change the focal distance (viewfinder magnification) of the viewfinder device 15. In the example of FIG. 2, the variable magnification lens 64 is provided inside the photographic subject side viewfinder window 16, but may be provided outside the photographic subject side viewfinder window 16. That is, the optical path of the viewfinder device 15 means the optical path that is formed along the incident optical axis L of the viewfinder device 15. This optical path may include the optical path outside the viewfinder device 15 without being limited to the optical path inside the viewfinder device 15.

The position of the variable magnification lens 64 is controlled, based on the focal distance (value determined by the position of the zoom lens 13*a*) of the photographing optical system of the digital camera 10. For example, if the focal distance of the photographing optical system is increased to reach a threshold value where the focal distance is sufficiently larger than the focal distance of the object lens 65, the variable magnification lens 64 is inserted on the optical path of the viewfinder device 15. Further, if the focal distance of the photographing optical system is reduced so that the focal distance is less than the threshold value, in the state where the variable magnification lens 64 is inserted on the optical path, the variable magnification lens 64 is removed from the optical path of the viewfinder device 15.

The half mirror 63 is installed obliquely with respect to the optical axis L at an angle of 45 degrees.

The display unit 61 comprises a liquid crystal display, for example, is adjacent to the half mirror 63, and is disposed to be parallel to the optical axis L. The display unit 61 displays information by allowing the light of a backlight to be penetrated through only a desired portion of a display screen and preventing the light of the backlight from being penetrated through the remaining portion (marked in black).

Thus, when the OVF shutter 62 is opened and an image is displayed on the display unit 61, an image obtained by the overlapping of an incident light (OVF optical image) which is transmitted from a photographic subject and is penetrated through the half mirror 63 and a light (EVF image displayed on the display unit 61) which is emitted from the display unit 61 and reflected by the half mirror 63 can be observed by the eyepiece window 17.

When the OVF shutter 62 is opened and the display unit 61 is in a non-display (OFF) state, the viewfinder device 15 is used as an optical viewfinder (OVF). Further, when the OVF shutter 62 is closed and the display unit 61 is in a display (ON) state, the viewfinder device 15 is used as an electronic viewfinder (EVF).

Any structure may be employed in the viewfinder device 15 as long as the structure allows the viewfinder device 15 to observe the image obtained by the overlapping of an image displayed on the display unit 61 and a photographic subject image (OVF optical image) viewed through the photographic subject side viewfinder window 16, by means of the eyepiece window 17, when the OVF shutter 62 is open. For example, the prism 66 and the display unit 61 may be eliminated from the configuration of the viewfinder device 15 of FIG. 2, and a see-through type display unit may be located at a position of the prism 66 such that a display surface thereof is perpendicular to the optical axis L.

The digital camera 10 is provided with an image input controller 31 configured to receive a digital photographing image signal outputted from the A/D converter 26*a*, an arithmetic processing unit (CPU) 32 configured to control the entire digital camera 10, an image signal processing circuit 33 configured to process the photographing image signal received by the image input controller 31 in a form of an image and generate a photographing image data, an AF detection circuit 34 configured to detect a focal position based on the photographing image data that is outputted from the solid state image capturing element 21*a*, an AE & AWB detection circuit 35 configured to automatically detect a quantity of exposure and a white balance, a memory 36 including, for example, a RAM used as a work memory or a ROM which is stored with various pieces of data, a compression processing circuit 39 configured to compress the photographing image data, which has been photographic subjected to the image processing, to a JPEG image or an MPEG image, a display control unit 41 configured to cause a photographing image or a live view image to be displayed on the liquid crystal display 40 that is provided on a rear surface of the camera, or to cause various images to be displayed on the display unit 61 in the viewfinder device 15, a media controller 43 configured to record the photographing image data in the recording medium 42, and a bus 44 configured to connect the above-mentioned components to each other.

An operating unit 50 is connected to the CPU 32 in which the manipulating unit 50 includes the shutter release button 14 illustrated in FIG. 1, a zoom button (not illustrated), etc. The CPU 32 controls the digital camera 10 based on a user instruction that is inputted through the operating unit 50.

The digital camera 10 is also provided with a motor driver 46 configured to supply a drive pulse to a drive motor of the zoom lens 13*a*, a motor driver 47 configured to supply a drive pulse to a drive motor of the focus lens 13*b*, a motor driver 48 configured to supply a drive signal to a drive motor that controls the aperture 24, a motor driver 53 configured to supply a drive signal to a drive motor that controls the position of the OVF shutter 62, a motor driver 54 configured to supply a drive signal to a drive motor included in an actuator that is a drive mechanism that controls the position of the variable magnification lens 64, and a timing generator 49 configured to supply a drive timing pulse to the solid state image capturing element 21*a*. The motor drivers 46, 47, 48, 53 and 54 and the timing generator 49 are operated based on an instruction from the CPU 32. The CDSAMP 25*a* is also operated based on an instruction from the CPU 32.

Figure 3:
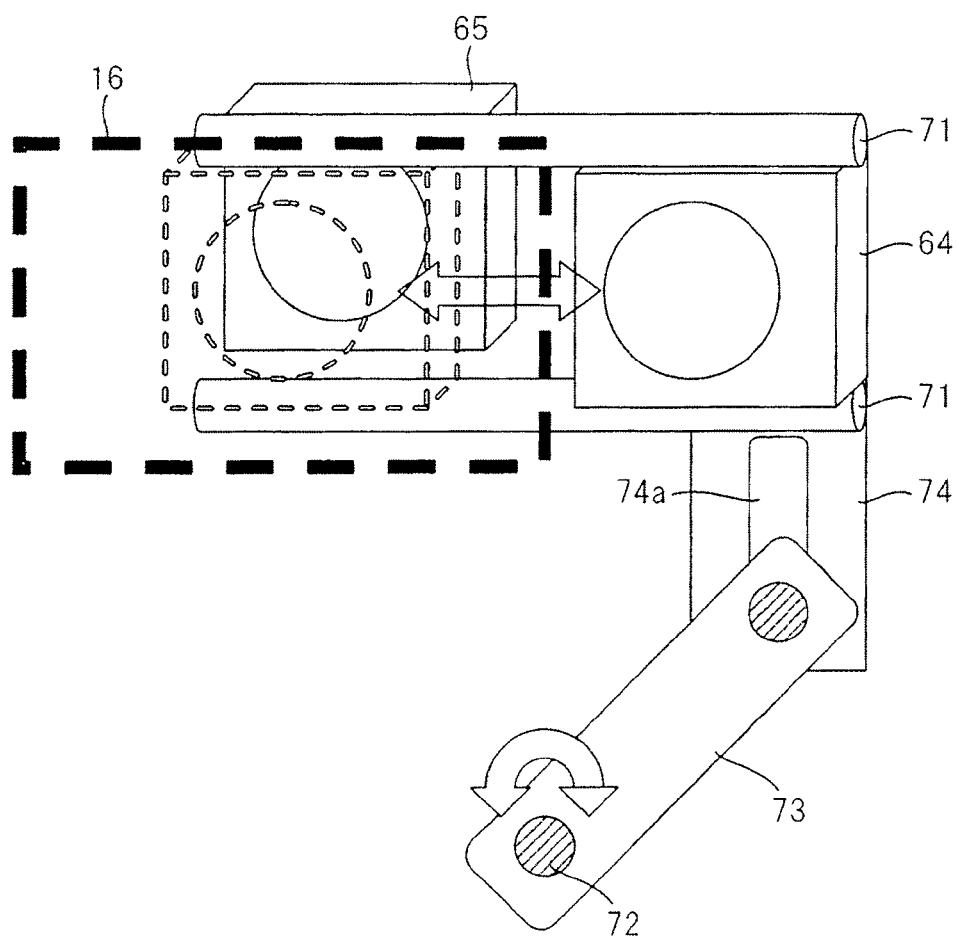
FIG. 3 is a view for describing a drive mechanism of a variable magnification lens 64 provided on a viewfinder device 15 illustrated in FIGS. 1 and 2.

FIG. 3 is a view for describing a drive mechanism of the variable magnification lens 64 provided on the viewfinder device 15 illustrated in FIGS. 1 and 2. In FIG. 3, the OVF shutter 62 is omitted.

As illustrated in FIG. 3, a slider 71 configured to slide the variable magnification lens 64 is disposed between the photographic subject side viewfinder window 16 and the object lens 65. The slider 71 extends in a direction orthogonal to the optical axis L of the viewfinder device 15. The variable magnification lens 64 is attached to the slider 71 and is configured to be movable in the direction orthogonal to the optical axis L.

A fixed member 74 having an opening 74*a* is mounted under the variable magnification lens 64. A rotating member 73 is attached to the fixed member 74 to be rotatable around a shaft 72. A drive motor (not illustrated) is connected to the shaft 72 of the rotating member 73, so that the drive motor is rotated in response to a drive signal supplied from the motor driver 54. When the drive motor rotates, the rotating member 73 rotates in a direction illustrated by the arrow in the drawing. According to the rotation, the fixed member 74 is moved leftward and rightward. Consequently, the rotating force of the drive motor is converted into the horizontal moving force of the fixed member 74 so that the variable magnification lens 64 moves in a horizontal direction. Although not illustrated in FIG. 3, both ends of the slider 71 are formed by walls.

Hence, when the variable magnification lens 64 is inserted on the optical path, one end of the variable magnification lens 64 in a moving direction comes into contact with a wall existing at a left end of the slider 71, thereby being stopped. When the variable magnification lens 64 is removed from the optical path, the other end in the moving direction comes into contact with a wall existing at a right end of the slider 71, thereby being stopped. Further, when the variable magnification lens 64 is removed from the optical path and thus comes into contact with the wall on the right end of the slider 71, it may be contemplated that the variable magnification lens 64 bounces to move back to the optical path and then is stopped. In such a case, in order to prevent the one end of the variable magnification lens 64 from entering the optical path, a space is preferably provided between a retraction position of the variable magnification lens 64 and the optical path.

In the digital camera, when the viewfinder device 15 is set to be used as the OVF, the OVF shutter 62 is opened during the application of power. A frame representing a photographing range determined by the focal distance of the photographing lens 1 is displayed on the display unit 61 by the control of the display control unit 41. From the eyepiece window 17 of the viewfinder device 15, the optical image within the range determined by the focal distance of the viewfinder device 15 is observed.

When the focal distance of the viewfinder device 15 is equal to the focal distance of the photographing lens 1, the optical image viewed from the eyepiece window 17 is almost equal in size to a range photographed by the image capturing element 21*a*. Meanwhile, when the focal distance of the photographing lens 1 is longer than the focal distance of the viewfinder device 15, a range narrower than the optical image viewed from the eyepiece window 17 is photographed by the image capturing element 21*a*. Therefore, when the focal distance of the photographing lens 1 is longer than the focal distance of the viewfinder device 15, the frame representing the range photographed by the image capturing element 21*a* is displayed on the display unit 61. The frame allows a user of the digital camera 10 to recognize an actually photographed range in the optical image viewed from the eyepiece window 17.

The frame representing the photographing range displayed by the display unit 61 is reduced in size as the focal distance of the photographing lens 1 is increased to be longer than the focal distance of the viewfinder device 15. When the frame becomes excessively small, it is difficult to identify the photographic subject within the photographing range. Thus, in the digital camera 10, when the focal distance of the photographing lens 1 reaches the threshold value (e.g., the focal distance of the viewfinder device 15 after the insertion of the variable magnification lens 64), the CPU 32 performs a control to insert the variable magnification lens 64 on the optical path of the viewfinder device 15. When the variable magnification lens 64 is inserted on the optical path, the focal distance of the viewfinder device 15 is increased. As a result, so that the frame representing the photographing range displayed on the display unit 61 is correspondingly increased, and thus, the photographic subject within the photographing range may be easily observed.

Meanwhile, in the state where the variable magnification lens 64 is inserted on the optical path, when the focal distance of the photographing lens 1 is reduced to such an extent that the focal distance is shorter than the focal distance (the above-mentioned threshold value) of the viewfinder device 15 after the insertion of the variable magnification lens 64, the frame representing the photographing range may not be displayed on the display unit 61. Therefore, when the focal distance of the photographing lens 1 is reduced to such an extent that the focal distance is less than the above-mentioned threshold value in the state where the variable magnification lens 64 is inserted on the optical path, the CPU 32 performs a control to remove the variable magnification lens 64 from the optical path.

When the moving distance of the variable magnification lens 64 from the state where the variable magnification lens 64 is inserted on the optical path (one end of the variable magnification lens 64 comes into contact with the wall of the slider 71) to the state where the variable magnification lens 64 is removed from the optical path and the other end of the variable magnification lens 64 comes into contact with the wall of the slider 71 is set as the maximum moving distance A, the CPU 32 performs a high-speed control for moving the variable magnification lens 64 through the maximum moving distance for a first time, or a low-speed control for moving the variable magnification lens 64 through the maximum moving distance for a second time that is longer than the first time in a switching manner depending on the using condition of the digital camera 10.

Figure 4:
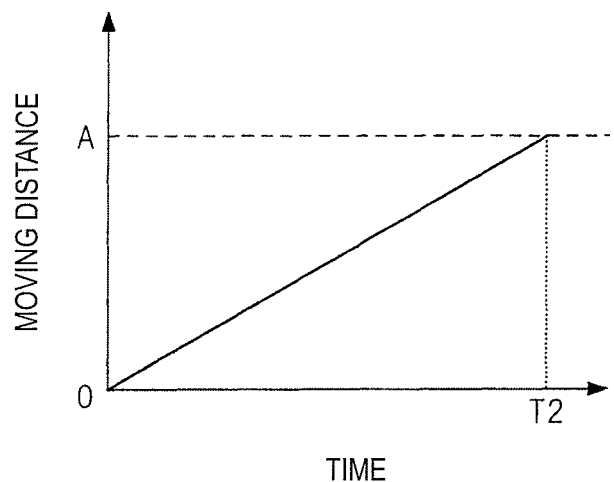
FIG. 4 is a view for describing an example of a low-speed control performed by a CPU 32.

FIG. 4 is a view for describing an example of a low-speed control performed by the CPU 32. Referring to FIG. 4, a vertical axis represents a moving distance of the variable magnification lens 64 and a horizontal axis represents a moving time of the variable magnification lens 64. In the example of FIG. 4, the CPU 32 gives an instruction to the motor driver 54 such that the variable magnification lens 64 moves through a distance A for a time T2, and the motor driver 54 supplies one kind of a drive signal to the drive motor in response to the instruction.

Figure 5:
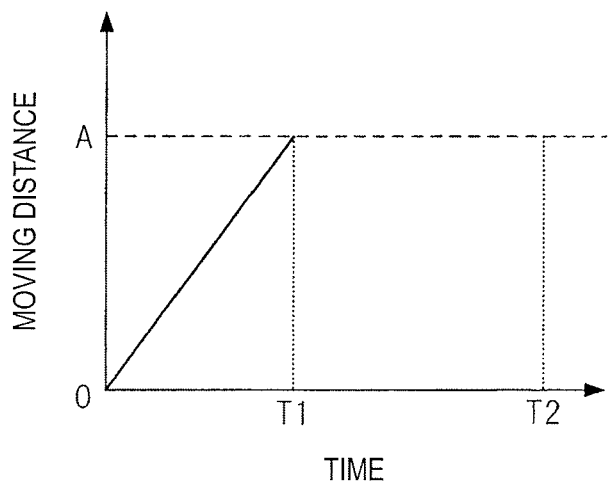
FIG. 5 is a view for describing an example of a high-speed control performed by the CPU 32.

FIG. 5 is a view for describing an example of a high-speed control performed by the CPU 32. Referring to FIG. 5, a vertical axis represents a moving distance of the variable magnification lens 64 and a horizontal axis represents a moving time of the variable magnification lens 64. In the example of FIG. 5, the CPU 32 gives an instruction to the motor driver 54 such that the variable magnification lens 64 moves through a distance A for a time T1 which is shorter than the time T2, and the motor driver 54 supplies a drive signal (this is different in kind from the drive signal of FIG. 4) to the drive motor in response to the instruction.

Figure 6:
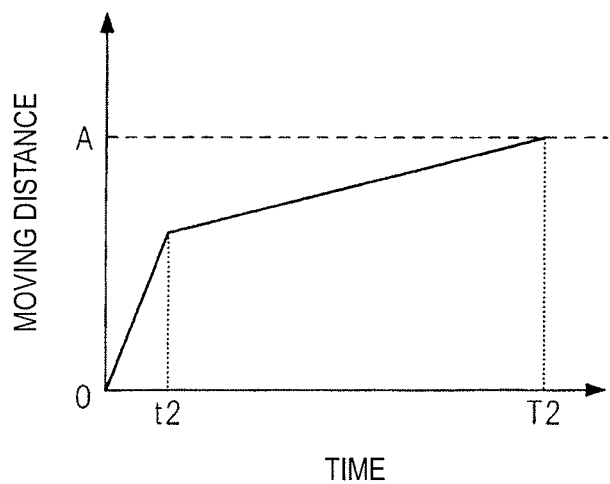
FIG. 6 is a view for describing another example of the low-speed control performed by the CPU 32.

FIG. 6 is a view for describing another example of the low-speed control performed by the CPU 32. Referring to FIG. 6, a vertical axis represents a moving distance of the variable magnification lens 64 and a horizontal axis represents a moving time of the variable magnification lens 64. The example of FIG. 6 is the same as that of FIG. 4 in that the CPU 32 gives an instruction to the motor driver 54 such that the variable magnification lens 64 moves through a distance A for a time T2. However, in the example of FIG. 6, the moving speed of the variable magnification lens 64 for a period from zero to a time t2 which is shorter than the time T2 is different from that for a period from the time t2 to the time T2. That is, in the example of FIG. 6, the motor driver 54 supplies two kinds of drive signals, i.e. a drive signal for moving the variable magnification lens 64 relatively fast and a drive signal for moving the variable magnification lens 64 relatively slow, to the drive motor in this order.

Figure 7:
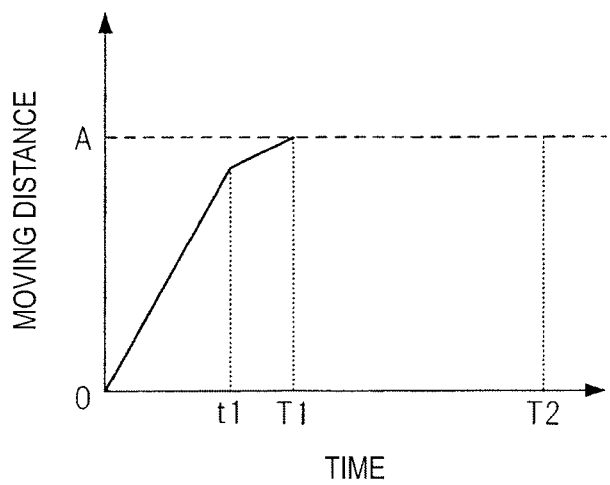
FIG. 7 is a view for describing another example of the high-speed control performed by the CPU 32.

FIG. 7 is a view for describing another example of the high-speed control performed by the CPU 32. Referring to FIG. 7, a vertical axis represents a moving distance of the variable magnification lens 64 and a horizontal axis represents a moving time of the variable magnification lens 64. The example of FIG. 7 is the same as that of FIG. 5 in that the CPU 32 gives an instruction to the motor driver 54 such that the variable magnification lens 64 moves through a distance A for a time T1. However, in the example of FIG. 7, the moving speed of the variable magnification lens 64 for a period from zero to a time t1 which is shorter than the time T1 is different from that for a period from the time t1 to the time T1. That is, in the example of FIG. 7, the motor driver 54 supplies two kinds of drive signals, i.e. a drive signal for moving the variable magnification lens 64 relatively fast and a drive signal for moving the variable magnification lens 64 relatively slow, to the drive motor in this order.

Figure 8:
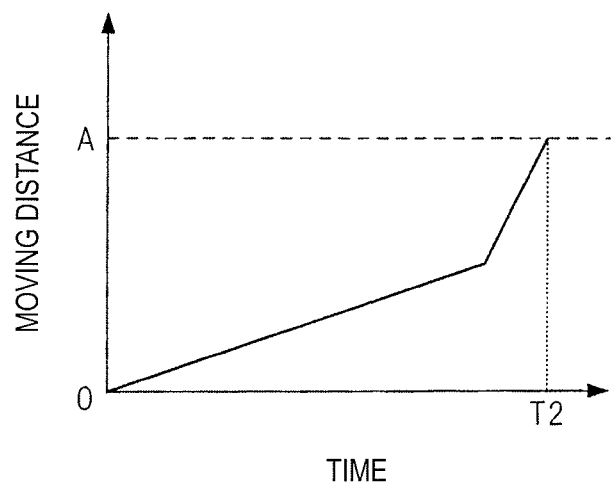
FIG. 8 is a view for describing yet another example of the low-speed control performed by the CPU 32.

FIG. 8 is a view for describing yet another example of the low-speed control performed by the CPU 32. The example of FIG. 8 is the same as that of FIG. 6 in that the two kinds of drive signals are supplied to the drive motor and then the variable magnification lens 64 moves through the distance A for the time T2. However, the example of FIG. 8 is different from that of FIG. 6 in that the motor driver 54 first supplies the drive signal for moving the variable magnification lens 64 relatively slow to the drive motor, and subsequently supplies the drive signal for moving the variable magnification lens 64 relatively fast to the drive motor.

Figure 9:
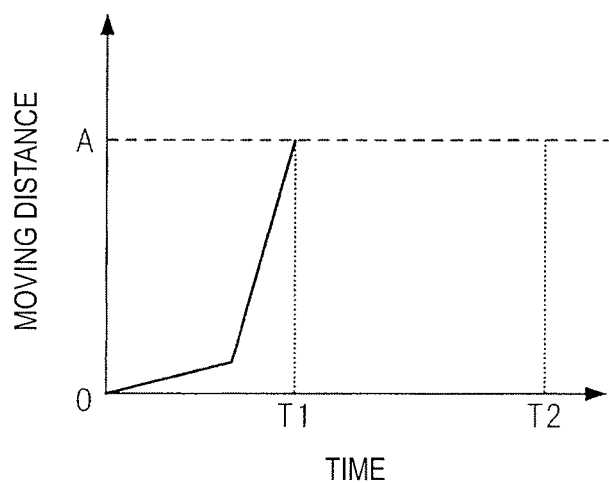
FIG. 9 is a view for describing yet another example of the high-speed control performed by the CPU 32.

FIG. 9 is a view for describing yet another example of the high-speed control performed by the CPU 32. The example of FIG. 9 is the same as that of FIG. 7 in that the two kinds of drive signals are supplied to the drive motor and then the variable magnification lens 64 moves through the distance A for the time T1. However, the example of FIG. 9 is different from that of FIG. 7 in that the motor driver 54 first supplies the drive signal for moving the variable magnification lens 64 relatively slow to the drive motor, and subsequently supplies the drive signal for moving the variable magnification lens 64 relatively fast to the drive motor.

The moving speed of the variable magnification lens 64 when the moving distance of the variable magnification lens 64 reaches the distance A according to the examples of FIGS. 6 and 7 is slower than the moving speed of the variable magnification lens according to the examples of FIGS. 8 and 9. When the moving distance of the variable magnification lens 64 reaches the distance A, the variable magnification lens 64 comes into contact with a wall provided at one of the ends of the slider 71 illustrated in FIG. 3. Therefore, when the moving speed of the variable magnification lens 64 is adjusted to be slow at the time when the variable magnification lens 64 comes into contact with the wall, the abrasion of the variable magnification lens 64 may be suppressed. Thus, the examples of FIGS. 6 and 7 may suppress the abrasion of the variable magnification lens 64, as compares to the examples of FIGS. 8 and 9.

The low-speed controls illustrated in FIGS. 4, 6 and 8 are slower in an average moving speed of the variable magnification lens 64 than the high-speed controls illustrated in FIGS. 5, 7 and 9. When the average moving speed is relatively slow the friction between the variable magnification lens 64 and the slider 71 is reduced. Therefore, according to the low-speed controls, the friction between the variable magnification lens 64 and the slider 71 may be reduced, thereby enhancing the durability of the viewfinder device 15.

Further, when the average moving speed is relatively fast, the viewfinder magnification of the viewfinder device 15 is switched correspondingly fast. Therefore, according to the high-speed control, it is possible to follow a change in focal distance of the photographing optical system at high speed. Meanwhile, since the high-speed control causes the variable magnification lens 64 to move faster than that in the low-speed control, the variable magnification lens 64 and the peripheral mechanisms thereof are excessively worn. Consequently, the high-speed control is inferior to the low-speed control from the viewpoint of durability.

As such, there are advantages in each of the low-speed control and the high-speed control performed by the CPU 32. In order to make the best use of these advantages, the CPU 32 selectively performs any of the high-speed control and the low-speed control depending on the using condition of the digital camera to control the movement of the variable magnification lens 64. By doing so, a reduction in the sense of incongruity when a user looks in the eyepiece window 17 and the extension of life span of the peripheral mechanisms of the variable magnification lens 64 may be made to be compatible.

Hereinafter, the operation of the digital camera 10 will be described.

Figure 10:
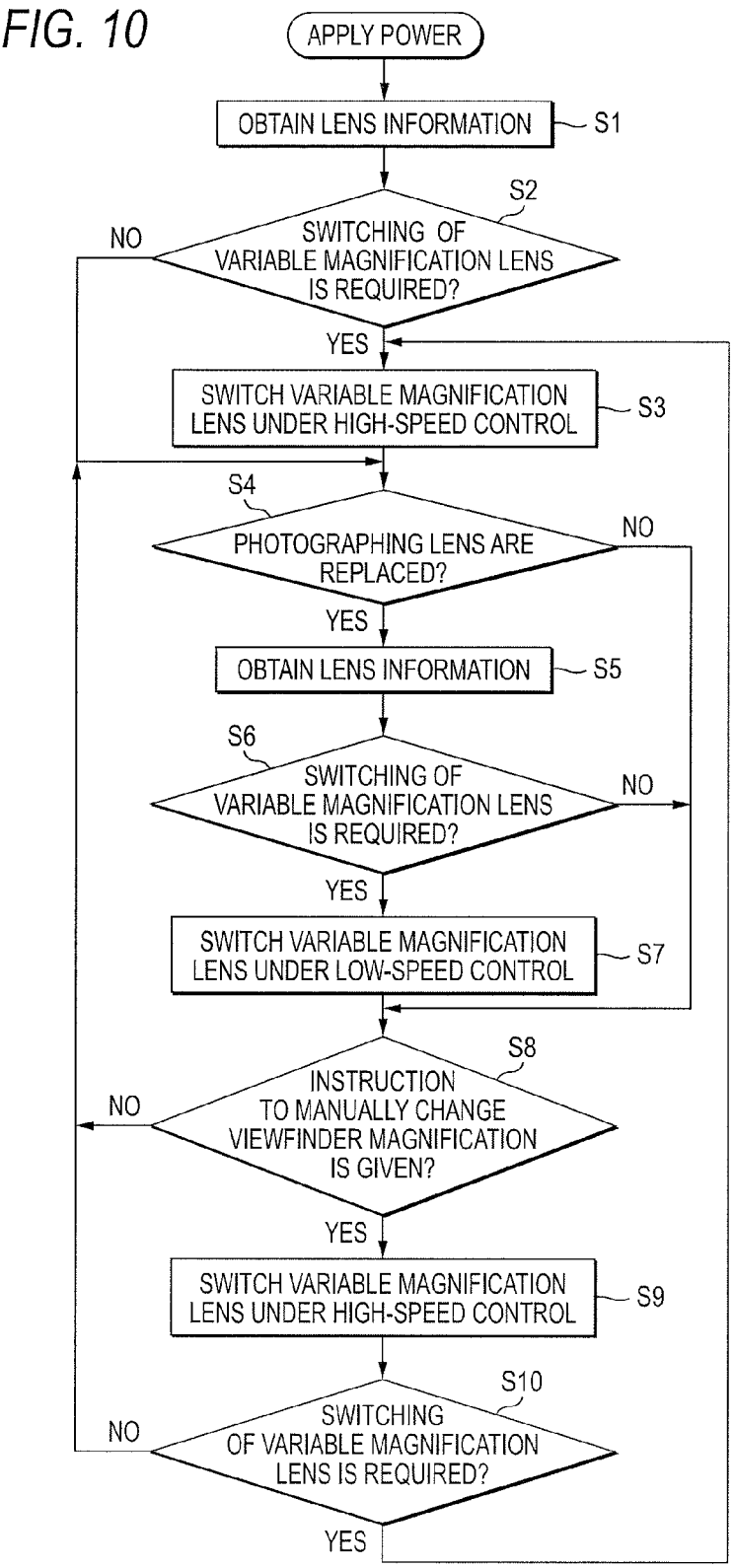
FIG. 10 is a flow chart illustrating an operation of the digital camera 10 illustrated in FIG. 1 after power is applied thereto.

FIG. 10 is a flow chart for describing an operation of the digital camera 10 illustrated in FIG. 1 after power is applied thereto.

When power is applied to the digital camera 10, the CPU 32 obtains information on the focal distance of the photographing lens 1 mounted in the digital camera 10 (step S1). The focal distance of the photographing lens 1 is a value determined by the position of the zoom lens 13*a*, and the CPU 32 detects the position of the zoom lens 13*a* and obtains information on the focal distance based on the positional information.

Subsequently, the CPU 32 determines whether the switching of the variable magnification lens 64 (the movement of the variable magnification lens 64 for changing the focal distance of the viewfinder device 15) is required based on the focal distance of the photographing lens 1 (step S2). For example, in the state where the variable magnification lens 64 is not inserted on the optical path, the CPU 32 determines that the switching of the variable magnification lens 64 is required when the focal distance of the photographing lens 1 reaches the above-mentioned threshold value, and that the switching of the variable magnification lens 64 is not required when the focal distance of the photographing lens 1 is shorter than the above-mentioned threshold value. Further, in the state where the variable magnification lens 64 is inserted on the optical path, the CPU 32 determines that the switching of the variable magnification lens 64 is not required when the focal distance of the photographing lens 1 reaches the above-mentioned threshold value, and that the switching of the variable magnification lens 64 is required when the focal distance of the photographing lens 1 is shorter than the above-mentioned threshold value.

When the switching of the variable magnification lens 64 is required, the CPU 32 moves the variable magnification lens 64 under the high-speed control so as to insert or retract the variable magnification lens 64 on or from the optical path (step S3). When the switching of the variable magnification lens 64 is not required, the CPU 32 performs step S4.

After the power is applied to the digital camera 10, a user often takes a photograph immediately. In such a case, it is assumed that the user looks in the eyepiece window 17. Therefore, when the switching of the variable magnification lens 64 is required immediately after the power is applied to the digital camera 10, the CPU 32 performs the high-speed control to move the variable magnification lens 64. This allows the movement of the variable magnification lens 64 to be completed within a shorter period of time, as compared to the low-speed control. Therefore, it is possible to decrease the sense of incongruity felt by the user who looks in the eyepiece window 17 during the movement of the variable magnification lens 64.

After step S3, the CPU 32 determines whether the photographing lens 1 is replaced with another one (or, another optical system is added to the lens barrel 12) (step S4). For example, the CPU 32 determines that the photographing lens 1 is replaced or added based on the information detected by a switch which detects the attachment or detachment of the lens installed around the photographing lens 1 of the digital camera 10.

When the determination of step S4 is YES, the CPU 32 obtains the information on the focal distance of the photographing lens 1 (step S5). Subsequently, the CPU 32 determines whether the switching of the variable magnification lens 64 is required based on the focal distance obtained at step S5 (step S6). When the switching of the variable magnification lens 64 is required, the CPU 32 moves the variable magnification lens 64 under the low-speed control to insert or retract the variable magnification lens 64 on or from the optical path (step S7).

When the photographing lens 1 is replaced after the power is applied to the digital camera 10, it is contemplated that the photographing lens 1 is replaced in a state where the user's eyes are off from the eyepiece window 17. That is, when the photographing lens 1 is replaced after the power is applied to the digital camera 10, it may be assumed that the user does not look in the eyepiece window 17.

Thus, when the photographing lens 1 is replaced after the power is applied to the digital camera 10, the CPU 32 performs the low-speed control to move the variable magnification lens 64. This may reduce the abrasion of the variable magnification lens 64 and the peripheral mechanisms thereof, thus enhancing the durability of the viewfinder device 15. Further, when the photographing lens 1 is replaced after power is applied to the digital camera 10, even if the variable magnification lens 64 moves slowly under the low-speed control, this state is less likely to be observed by a user. Therefore, it is possible to reduce the possibility of giving the sense of incongruity to the user.

When the determination of step S4 is NO and when the determination of step S6 is NO, the CPU 32 performs step S8 after step S7.

At step S8, it is determined whether the CPU 32 instructs that the viewfinder magnification (focal distance) of the viewfinder device 15 is switched (step S8). With the digital camera 10, a user operates the operating unit 50 to switch the viewfinder magnification (focal distance) of the viewfinder device 15 to two phases, namely, a phase which is the above-mentioned threshold value or more and a phase which is less than the above-mentioned threshold value.

When the determination of step S8 is YES, the CPU 32 moves the variable magnification lens 64 under the high-speed control to insert or retract the variable magnification lens 64 on or from the optical path (step S9). When the determination of step S8 is NO, the CPU 32 performs step S4.

When a viewfinder-magnification switching instruction is inputted from the operating unit 50, it is desirable to move the variable magnification lens 64 fast in response to a user's manipulation in order to improve the usability of the digital camera. Thus, when the viewfinder-magnification switching instruction is inputted from the operating unit 50, the CPU 32 performs the high-speed control. By doing so, a response to the switching of the variable magnification lens 64 may be improved such that the usability may be improved.

After step S9, the CPU 32 determines whether the switching of the variable magnification lens 64 is required based on the information on the focal distance of the photographing lens 1 at this point (step S10). When the switching of the variable magnification lens 64 is required, the CPU 32 performs step S3 to move the variable magnification lens 64 under the high-speed control so as to insert or retract the variable magnification lens 64 on or from the optical path. When the determination of step S10 is NO, the CPU 32 returns the process to step S4.

When the movement of the variable magnification lens 64 is required immediately after the power is applied, when the movement of the variable magnification lens 64 is required immediately after the photographing lens 1 is replaced, and when the movement of the variable magnification lens 64 is required except for the case where the viewfinder magnification of the viewfinder device 15 is manually changed, that is, when the user operates a zoom button included in the operating unit 50 and performs a zoom operation to switch the angle of view into tele and wide (step S10: YES), the CPU 32 performs the high-speed control to move the variable magnification lens 64. When the determination of step S10 is YES, it is contemplated that the user normally performs the zoom operation while looking in the eyepiece window 17. Thus, when the determination of step S10 is YES, the CPU 32 performs the high-speed control to move the variable magnification lens 64 such that the user does not feel the sense of incongruity.

As stated above, in the digital camera 10 illustrated in FIG. 1, when it is necessary to move the variable magnification lens 64, the CPU 32 moves the variable magnification lens 64 under any of the high-speed control and the low-speed control depending on the using condition of the digital camera 10. Therefore, the reduction in the sense of incongruity giving a user in the high-speed control and the reduction in the abrasion of the variable magnification lens 64 and the peripheral mechanisms thereof in the low-speed control may be made to be compatible. Thus, it is possible to improve the usability and to extend the life span of the digital camera 10.

Figure 11:
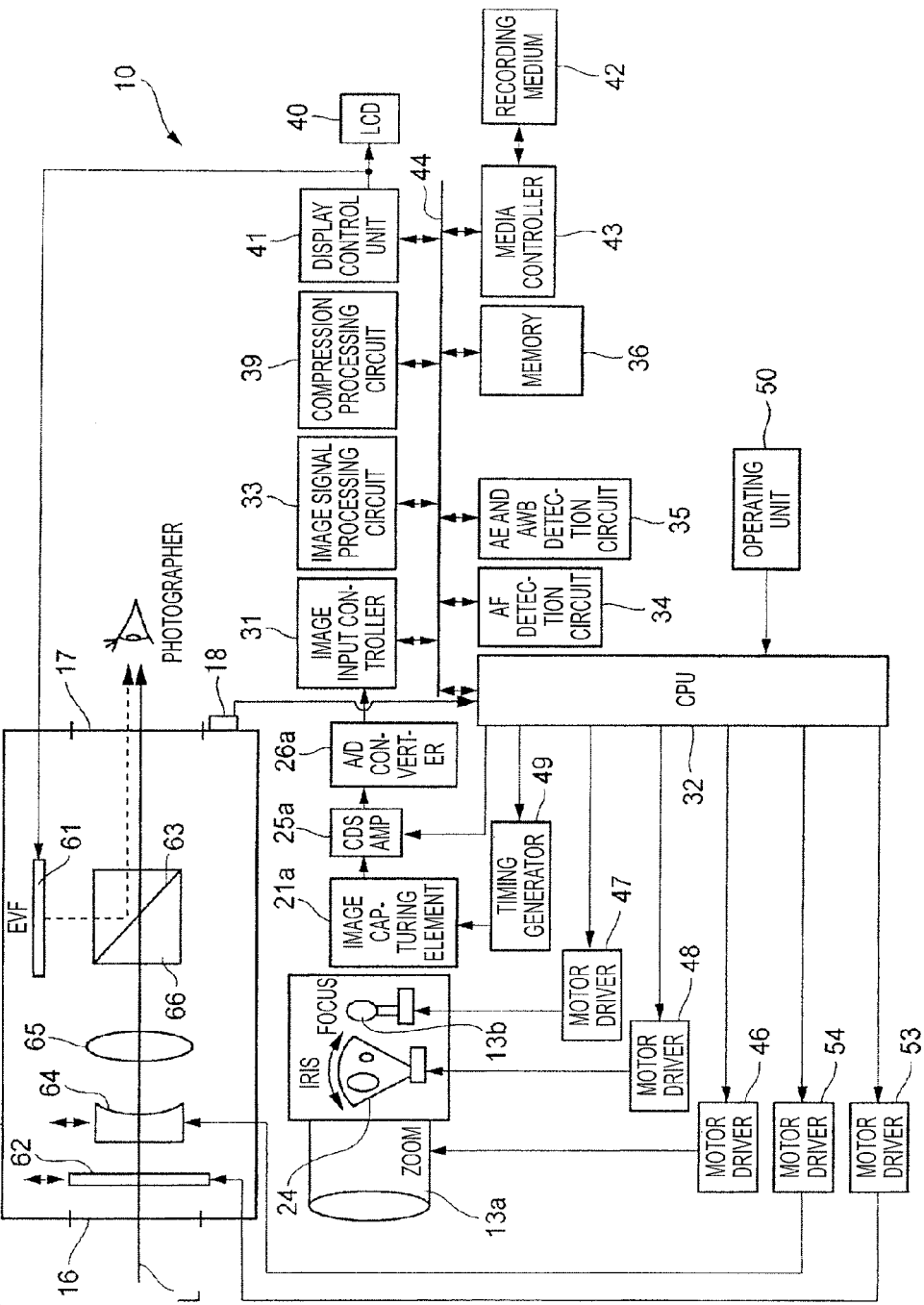
FIG. 11 is a view for describing a modification of an internal configuration of the digital camera illustrated in FIG. 1.

FIG. 11 is a view for describing a modification of an internal configuration of the digital camera illustrated in FIG. 1. The components in FIG. 11 which are the same as those of FIG. 2 are denoted by the same reference numerals.

The digital camera of FIG. 11 has the same configuration as that of FIG. 2 except that an eye sensor 18 is additionally provided.

The eye sensor 18 is an object detecting means that detects whether an object (e.g., a user's eye) is in contact with the eyepiece window 17 of the viewfinder device 15. The eye sensor 18 sends an object contact detecting signal to the CPU 32 when the object is in contact with the eyepiece window 17, and sends an object non-contact detecting signal to the CPU 32 when the object is not in contact with the eyepiece window 17.

Figure 12:
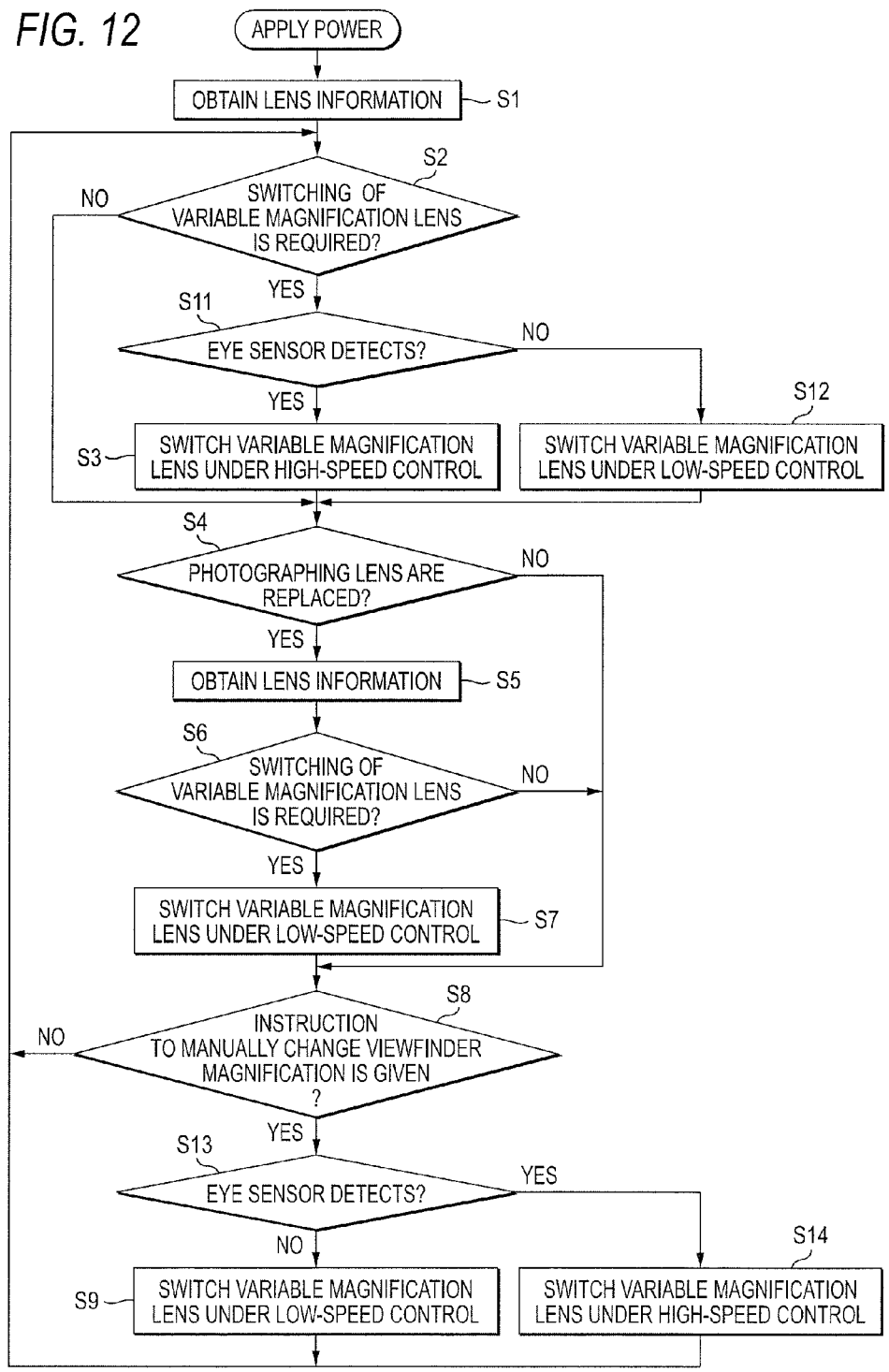
FIG. 12 is a flow chart illustrating an operation of the digital camera 10 illustrated in FIG. 11.

FIG. 12 is a flow chart illustrating an operation of the digital camera illustrated in FIG. 11. The steps of FIG. 12 which are the same as those of FIG. 10 will be denoted by the same reference numerals, and the descriptions thereof will not be omitted.

When the determination of step S2 is YES, the CPU 32 determines whether the object is detected by the eye sensor 18, based on a signal received from the eye sensor 18 (step S11).

When the object contact detecting signal is received from the eye sensor 18 (step S11: YES), the CPU 32 performs the high-speed control to move the variable magnification lens 64 (step S3). Further, when the object non-contact detecting signal is received from the eye sensor 18 (step S11: NO), the CPU 32 performs the low-speed control to move the variable magnification lens 64 (step S12).

After step S3 and step S12, the CPU 32 performs steps subsequent to step S4.

When the determination of step S8 is YES, the CPU 32 determines whether the object is detected by the eye sensor 18, based on a signal received from the eye sensor 18 (step S13).

When the object contact detecting signal is received from the eye sensor 18 (step S13: YES), the CPU 32 performs the high-speed control to move the variable magnification lens 64 (step S14). Further, when the object non-contact detecting signal is received from the eye sensor 18 (step S13: NO), the CPU 32 performs the low-speed control to move the variable magnification lens 64 (step S9).

After steps S9 and S14, the CPU 32 returns the process to step S2.

As described above, since the digital camera illustrated in FIG. 11 is provided with the eye sensor 18, it is possible to determine whether the user looks in the eyepiece window 17, based on the detected result of the eye sensor 18. Therefore, when the switching of the variable magnification lens 64 is required and the object is not detected by the eye sensor 18, the CPU 32 performs the low-speed control to reduce the abrasion of the viewfinder device 15. When the object is detected by the eye sensor 18, the CPU 32 performs the high-speed control to reduce the sense of incongruity given to a user.

In the flow chart of FIG. 12, when the photographing lens 1 is replaced or another optical system is added to the photographing lens 1, the CPU 32 moves the variable magnification lens 64 under the low-speed control, without depending on the detected result of the eye sensor 18. Usually, it may not be contemplated that the photographing lens 1 is replaced or another optical system is added while the user's eyes are being applied to the eyepiece window 17. Therefore, when the photographing lens 1 is replaced or another optical system is added to the photographing lens 1, the CPU 32 performs the low-speed control to move the variable magnification lens 64 such that the variable magnification lens 64 and the peripheral mechanisms thereof may be prevented from being worn.

Further, a case in which the object is not detected by the eye sensor 18 while each of steps S3 and S14 in FIG. 12 is being processed may also be contemplated. In such a case, it is desirable to switch a control operation to move the variable magnification lens 64 at a low speed such that the variable magnification lens 64 and the peripheral mechanisms thereof may be prevented from being worn.

A case in which the object is detected by the eye sensor 18 while each of steps S7, S9 and S12 in FIG. 12 is being processed may also be contemplated. In such a case, it is desirable to switch the control operation to move the variable magnification lens 64 at a high speed so as to reduce the sense of incongruity given to the user.

Figure 13:
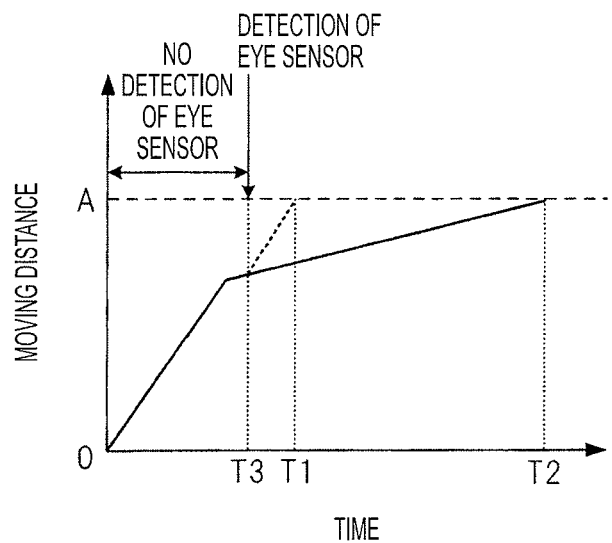
FIG. 13 is a view for describing an example of switching from the low-speed control to the high-speed control of the CPU 32 of the digital camera illustrated in FIG. 11.

For example, as illustrated in FIG. 13, when the variable magnification lens 64 is moved under the low-speed control for moving it through the distance A for the time T2 and the eye sensor 18 detects the contact of the object in the time T3

(<T1), the CPU 32 changes the drive signal supplied from the motor driver 54 to the drive motor so that the moving distance of the variable magnification lens 64 reaches the distance A in the time T1. That is, the CPU 32 is switched from the low-speed control to the high-speed control to move the variable magnification lens 64. Thus, the variable magnification lens 64 moves at a higher speed from the time T3 so that the moving distance reaches the distance A in the time T1. Therefore, the moving time of the variable magnification lens 64 may be shortened by the time of T2-T1 and thereby reduce the sense of incongruity giving to a user.

Figure 14:
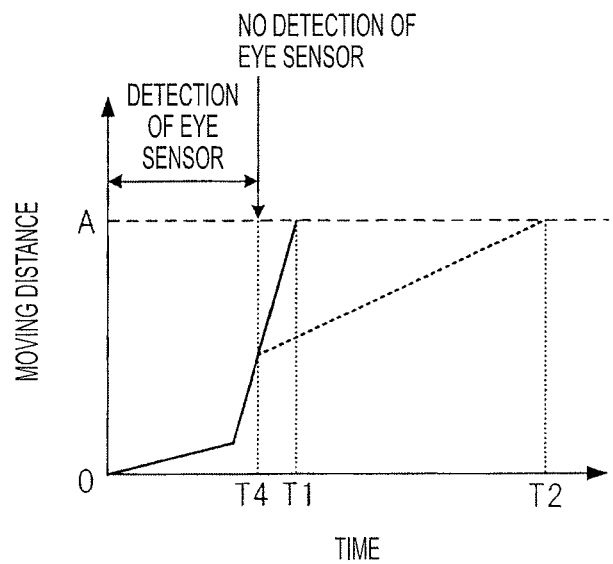
FIG. 14 is a view for describing an example of switching from the high-speed control to the low-speed control of the CPU 32 of the digital camera illustrated in FIG. 11.

Further, as illustrated in FIG. 14, when the variable magnification lens 64 is moved under the high-speed control for moving it to the distance A for the time T1 and the eye sensor 18 does not detect the contact of the object in the time T4 (<T1), the CPU 32 changes the drive signal supplied from the motor driver 54 to the drive motor so that the moving distance of the variable magnification lens 64 reaches the distance A in the time T2. That is, the CPU 32 is switched from the high-speed control to the low-speed control to move the variable magnification lens 64. Thus, the variable magnification lens 64 moves at a lower speed from the time T4, so that the moving distance reaches the distance A in the time T2. Therefore, the moving time of the variable magnification lens 64 is increased by the time of T2-T1 but the variable magnification lens 64 correspondingly moves slowly. As a result, the abrasion of the variable magnification lens 64 and the peripheral mechanisms thereof may be reduced.

In the example of FIG. 13, when the contact of the object is detected by the eye sensor 18 in the time T3' that is longer than the time T1 and shorter than the time T2, the CPU 32 preferably moves the variable magnification lens 64 at a settable maximum speed so that the moving distance of the variable magnification lens 64 reaches the moving distance A in a time shorter than the time T2. In such a case, consequently, a control operation will be carried out so that a time when the moving distance of the variable magnification lens 64 reaches the distance A is shorter than the low-speed control. Thus, the sense of incongruity given to the user may be suppressed to the minimum.

The digital camera 10 illustrated in FIGS. 2 and 12 may have a configuration (a configuration of switching the viewfinder magnification to three or more phases) where a plurality of variable magnification lenses 64 is included in the viewfinder device 15 and is switched to be inserted on the optical path. Even if the digital camera is equipped with the plurality of variable magnification lenses 64, the CPU 32 moves the variable magnification lens 64 under any of the low-speed control and the high-speed control depending on the condition when it is determined that it is necessary to move the variable magnification lenses 64. This ensures that both the long life of the viewfinder device 15 and the improvement of the usability are made to be compatible.

Further, in the flow chart illustrated in FIGS. 10 and 12, it is desirable to for the CPU 32 to control the OVF shutter 62 in a closed state while the CPU 32 performs the high-speed control to move the variable magnification lens 64, and to control the OVF shutter 62 in an open state after the movement of the variable magnification lens 64 has been completed. While the variable magnification lens 64 is moving, the OVF shutter 62 is closed such that the moving state of the variable magnification lens 64 cannot be viewed through the eyepiece window 17. As a result, the sense of incongruity given to the user may be reduced. Further, since the movement of the variable magnification lens 64 is performed within a short period of time under the high-speed control, it takes a short time to make the OVF shutter 62 closed. Therefore, a length of time where the optical image viewed from the eyepiece window 17 is blocked is extremely less. Thus, it is possible to prevent a user from losing a photographic subject during the movement of the variable magnification lens 64.

Further, in the flow chart illustrated in FIG. 12, when the contact of the object is detected by the eye sensor 18 while the CPU 32 performs the low-speed control to move the variable magnification lens 64, it is desirable for the CPU 32 to control the OVF shutter 62 in the closed state and as the same time, to perform a control to cause an image photographed by the solid state image capturing element 21a to be displayed on the display unit 61. In other words, when the user removes the eyepiece window 17 while the CPU 32 performs the low-speed control to move the variable magnification lens 64, the viewfinder device 15 is operated as an EVF.

By doing so, since the variable magnification lens 64 can be continuously moved under the low-speed control, it is possible to reduce the abrasion of the variable magnification lens 64 and the peripheral mechanisms thereof. In addition, since the image displayed on the display unit 61 is seen from the eyepiece window 17, it is possible to prevent the user from losing the photographic subject during the movement of the variable magnification lens 64.

The viewfinder device 15 may be a simple optical viewfinder which is not provided with a display unit 61. When the viewfinder device 15 is equipped with the display unit 61, even if a user looks in the eyepiece window 17 during the low-speed control, the viewfinder device 15 may be operated as the EVF to maintain the low-speed control. Thus, the above-mentioned effects may be obtained.

Further, the combination of the low-speed control and the high-speed control executed by the CPU 32 may be executed by any combination of the low-speed controls illustrated in FIGS. 4, 6 and 8, respectively, and the high-speed controls illustrated in FIGS. 5, 7 and 9, respectively. The combination of FIGS. 6 and 7 is most preferable. According to this combination, the speed when the moving distance of the variable magnification lens 64 reaches the distance A becomes slower than the maximum speed among speeds during the movement of the variable magnification lens 64. For this reason, it is possible to absorb shock occurring when the variable magnification lens 64 comes into contact with the wall and thus, the life span of the viewfinder device 15 may be extended.

In the examples of FIGS. 6 to 9, the high-speed controls and the low-speed controls are performed with the combination of two kinds of drive signals. However, the high-speed controls and the low-speed controls may be performed with the combination of three or more kinds of drive signals. In this case, when, among the three or more kinds of drive signals, a drive signal other than a drive signal that makes the moving speed of the variable magnification lens 64 maximum is supplied to the drive motor at the time point when the variable magnification lens 64 reaches the distance A, the abrasion caused by the collision between the variable magnification lens 64 and the wall can be suppressed to the minimum.

Referring to FIGS. 10 and 12, when the digital camera 10 is configured such that the photographing lens 1 cannot be replaced, steps S4 to S7 may be omitted. In addition, when it is impossible to manually change the viewfinder magnification of the viewfinder device 15 of the digital camera 10, steps S8 and S9 of FIG. 10 and steps S8, S13, S9 and S14 of FIG. 12 may be omitted.

The time T1 and the time T2 exemplified in FIGS. 4 to 9 may be optionally set by the user.

As described above, the following aspects are disclosed in the present specification.

It is disclosed an image capturing apparatus including: a photographing optical system; an image capturing element configured to capture an image through the photographing optical system; and a viewfinder device configured to be capable of observing a photographic subject through an optical system that is different from the photographing optical system, in which the viewfinder device includes at least one variable magnification lens that may be inserted on and removed from an optical path of the viewfinder device, the at least one variable magnification lens being configured to change a focal distance of the viewfinder device, and a drive mechanism configured to drive the variable magnification lens, in which the image capturing apparatus further includes: a variable magnification lens control unit configured to supply a drive signal to the drive mechanism so as to control the insertion and removal of the variable magnification lens on and from the optical path, in which one end of the variable magnification lens in a moving direction is in contact with a wall provided in the viewfinder device in a state where the variable magnification lens is inserted on the optical path, in which a moving distance of the variable magnification lens from a state where the variable magnification lens is inserted on the optical path to a state where the variable magnification lens is removed from the optical path and the other end of the variable magnification lens is in contact with a wall provided in the viewfinder device is set to a maximum moving distance of the variable magnification lens, and in which the variable magnification lens control unit performs a high-speed control to move the variable magnification lens through the maximum moving distance for a first time, and a low-speed control to move the variable magnification lens through the maximum moving distance for a second time that is longer than the first time.

The disclosed image capturing apparatus may have a configuration, in which the variable magnification lens control unit supplies a plurality of kinds of drive signals to the drive mechanism, a moving speed of the variable magnification lens varying depending on each of the plurality of kinds of drive signals, in which the variable magnification lens control unit performs at least any of the low-speed control and the high-speed control by combining at least two of the plurality of kinds of drive signals with each other and then supplying the combined drive signals to the drive mechanism, and in which the variable magnification lens control unit supplies the at least two kinds of drive signals to the drive mechanism in such a manner that the moving speed of the variable magnification lens at a time point when a moving distance of the variable magnification lens moved by any of the low-speed control and the high-speed control reaches the maximum moving distance is smaller than a maximum value of the moving speed while the variable magnification lens is moving through the maximum moving distance.

The disclosed image capturing apparatus may have a configuration, in which the photographing optical system may be replaced with another one, or an additional optical system may be added to the photographing optical system, in which the image capturing apparatus includes a variable magnification lens movement determining unit configured to determine whether movement of the variable magnification lens is required based on a focal distance of the photographing optical system, and in which, when the photographing optical system is replaced or the additional optical system is added in a state where power is applied to the image capturing apparatus, and when it is determined by the variable magnification lens movement determining unit that the movement of the variable magnification lens is required, the variable magnification lens control unit performs the low-speed control to move the variable magnification lens.

The disclosed image capturing apparatus may have a configuration, in which, when an instruction to move the variable magnification lens is manually given after the power is applied to the image capturing apparatus, the variable magnification lens control unit performs the high-speed control to move the variable magnification lens.

The disclosed image capturing apparatus has a configuration, in which the viewfinder device includes: a viewfinder shutter configured to be capable of switching between a closed state where light incident from a photographic subject side viewfinder window is blocked to be prevented from being incident on an eyepiece window and an open state where light incident from the photographic subject side viewfinder window is passed to be incident on the eyepiece window, and a display unit configured to display an image and disposed to allow the image to be observed through the eyepiece window, in which the viewfinder device is configured such that, when the viewfinder shutter is opened, an image obtained by overlapping the image displayed on the display unit and an optical image incident from the photographic subject side viewfinder window on the eyepiece window may be observed from the eyepiece window, in which the image capturing apparatus further includes: an object detection unit configured to detect whether an object is in contact with the eyepiece window; a viewfinder shutter control unit configured to control a state of the viewfinder shutter; and a display control unit configured to perform a control such that an image is displayed on the display unit, in which, when the object is detected by the object detection part while the low-speed control is being performed, the viewfinder shutter control unit controls the viewfinder shutter in the closed state, and the display control unit displays an image captured by the image capturing element on the display unit.

The disclosed image capturing apparatus, may further include: an object detection unit configured to detect whether an object is in contact with the eyepiece window of the viewfinder device, in which the variable magnification lens control unit performs the low-speed control to move the variable magnification lens when the object is not detected by the object detection unit, and performs the high-speed control to move the variable magnification lens when the object is detected by the object detection unit.

Any one of the configurations described above provides an image capturing apparatus which may improve the durability of a viewfinder device equipped with a variable magnification lens such that the life span of a product can be extended.

Although the exemplary embodiments of the present invention have been disclosed for illustrative purposes, it will be obvious to those skilled in the art that various changes or modifications may be made without departing from the spirit and scope of the present invention. The present application is based upon Japanese Patent Application No. 2011-213130 filed on Sep. 28, 2011, the disclosure of which is incorporated herein by reference.

What is claimed is:
1. An image capturing apparatus comprising:
a photographing optical system;
an image capturing element configured to capture an image through the photographing optical system; and
a viewfinder device configured to be capable of observing a photographic subject through an optical system that is different from the photographing optical system,
wherein the viewfinder device includes at least one variable magnification lens that may be inserted on and removed from an optical path of the viewfinder device, the at least one variable magnification lens being configured to change a focal distance of the viewfinder device, and a drive mechanism configured to drive the variable magnification lens, wherein the image capturing apparatus further comprises:
a variable magnification lens control unit configured to supply a drive signal to the drive mechanism so as to control the insertion and removal of the variable magnification lens on and from the optical path,
wherein one end of the variable magnification lens in a moving direction is in contact with a wall provided in the viewfinder device in a state where the variable magnification lens is inserted on the optical path,
wherein a moving distance of the variable magnification lens from a state where the variable magnification lens is inserted on the optical path to a state where the variable magnification lens is removed from the optical path and the other end of the variable magnification lens is in contact with a wall provided in the viewfinder device is set to a maximum moving distance of the variable magnification lens,
wherein the variable magnification lens control unit performs a high-speed control to move the variable magnification lens through the maximum moving distance for a first time, and a low-speed control to move the variable magnification lens through the maximum moving distance for a second time that is longer than the first time,
wherein the photographing optical system may be replaced with another one, or an additional optical system may be added to the photographing optical system,
wherein the image capturing apparatus includes a variable magnification lens movement determining unit configured to determine whether movement of the variable magnification lens is required based on a focal distance of the photographing optical system, and
wherein, when the photographing optical system is replaced or the additional optical system is added in a state where power is applied to the image capturing apparatus, and when it is determined by the variable magnification lens movement determining unit that the movement of the variable magnification lens is required, the variable magnification lens control unit performs the low-speed control to move the variable magnification lens.

2. The image capturing apparatus according to claim 1,
wherein the variable magnification lens control unit supplies a plurality of kinds of drive signals to the drive mechanism, a moving speed of the variable magnification lens varying depending on each of the plurality of kinds of drive signals,
wherein the variable magnification lens control unit performs at least any of the low-speed control and the high-speed control by combining at least two of the plurality of kinds of drive signals with each other and then supplying the combined drive signals to the drive mechanism, and
wherein the variable magnification lens control unit supplies the at least two kinds of drive signals to the drive mechanism in such a manner that the moving speed of the variable magnification lens at a time point when a moving distance of the variable magnification lens moved by any of the low-speed control and the high-speed control reaches the maximum moving distance is smaller than a maximum value of the moving speed while the variable magnification lens is moving through the maximum moving distance.

3. The image capturing apparatus according to claim 1,
wherein, when an instruction to move the variable magnification lens is manually given after the power is applied to the image capturing apparatus, the variable magnification lens control unit performs the high-speed control to move the variable magnification lens.

4. The image capturing apparatus according to claim 1,
wherein the viewfinder device includes: a viewfinder shutter configured to be capable of switching between a closed state where light incident from a photographic subject side viewfinder window is blocked to be prevented from being incident on an eyepiece window and an open state where light incident from the photographic subject side viewfinder window is passed to be incident on the eyepiece window, and a display unit configured to display an image and disposed to allow the image to be observed through the eyepiece window,
wherein the viewfinder device is configured such that, when the viewfinder shutter is opened, an image obtained by overlapping the image displayed on the display unit and an optical image incident from the photographic subject side viewfinder window on the eyepiece window may be observed from the eyepiece window,
wherein the image capturing apparatus further comprises:
an object detection unit configured to detect whether an object is in contact with the eyepiece window;
a viewfinder shutter control unit configured to control a state of the viewfinder shutter; and
a display control unit configured to perform a control such that an image is displayed on the display unit,
wherein, when the object is detected by the object detection part while the low-speed control is being performed, the viewfinder shutter control unit controls the viewfinder shutter in the closed state, and the display control unit displays an image captured by the image capturing element on the display unit.

5. The image capturing apparatus according to claim 1, further comprising:
an object detection unit configured to detect whether an object is in contact with the eyepiece window of the viewfinder device,
wherein the variable magnification lens control unit performs the low-speed control to move the variable magnification lens when the object is not detected by the object detection unit, and performs the high-speed control to move the variable magnification lens when the object is detected by the object detection unit.

* * * * *